Dec. 11, 1928.

E. K. COLE

CABLE CLAMP 1,694,683

Original Filed Feb. 1, 1927

Inventor
Elmer K. Cole.
by Orwig & Hague, Attys.

Patented Dec. 11, 1928.

1,694,683

UNITED STATES PATENT OFFICE.

ELMER K. COLE, OF WINTERSET, IOWA.

CABLE CLAMP.

Application filed February 1, 1927, Serial No. 165,186. Renewed September 4, 1928.

The object of my invention is to provide a cable clamp of simple, durable and inexpensive construction which may be easily and quickly applied, and when so applied will form a rigid connection without seriously crimping or weakening the cable.

My invention consists in the construction, arrangement and combination of the various parts of the device, whereby the objects contemplated are attained, as hereinafter more fully set forth, pointed out in my claims, and illustrated in the accompanying drawings, in which:

Figure 1:
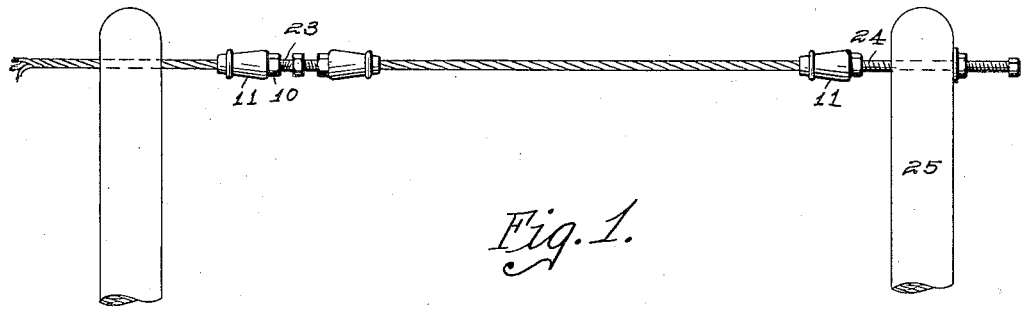
Figure 1 is a side elevation of my improved cable clamp showing the manner in which it is applied to a cable.
Figure 2:
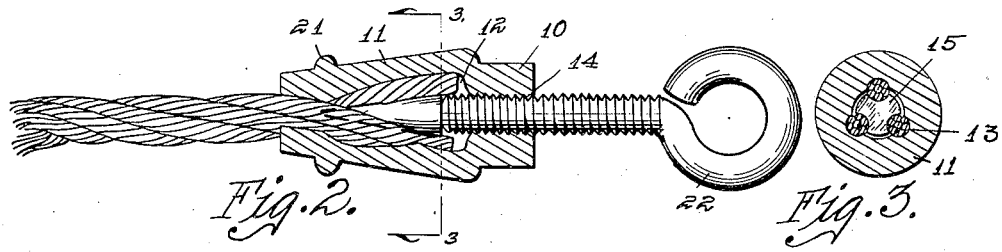
Figure 2 is an enlarged, detail, sectional view of my improved cable clamp.
Figure 3:
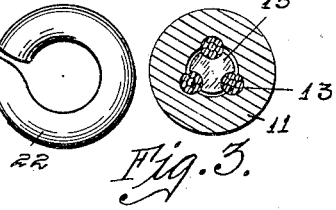
Figure 3 is a detail sectional view taken on the line 3—3 of Figure 2.
Figure 4:
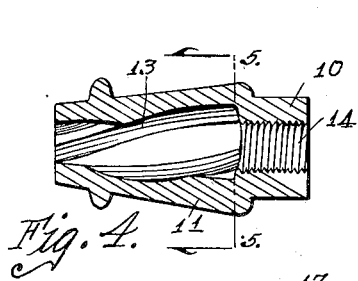
Figure 4 is a longitudinal sectional view of the outer casing of my improved clamp.
Figure 5:
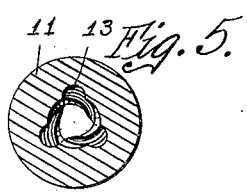
Figure 5 is a detail sectional view taken on the line 5—5 of Figure 4.
Figure 6:
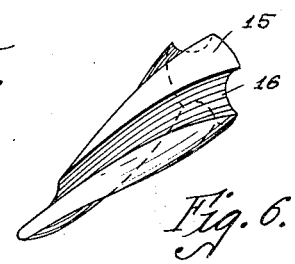
Figure 6 is a perspective view of the wedge member.
Figure 7:
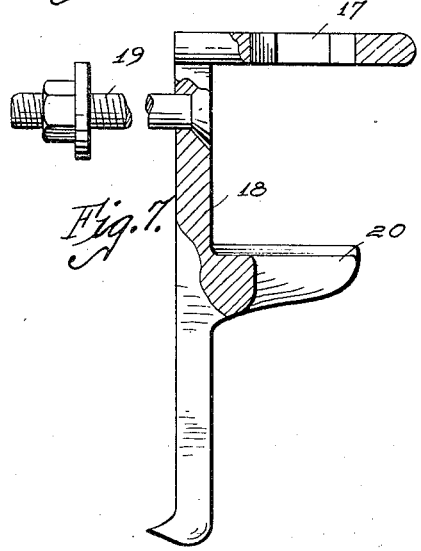
Figure 7 is a side elevation of the tool for supporting the cable clamp while the cable is being applied.

My improved device comprises a base member 10 formed preferably with its outer surface hexagonal. The member 10 is provided with a cone shaped body portion 11 provided with a conical recess 12, the inner surface of said body portion being provided with a number of helical grooves 13 for receiving the large strands of the cable. The base of the conical shaped member 11 is connected to the base portion 10 as clearly shown in Figures 3 and 4. The member 10 is provided with a screw threaded opening 14. The small end of the recess 12 is the same size as the cable which it is designed to support, one end of the cable being inserted into the recess 12 in the manner shown in Figure 2, with the strands entering the grooves 13. The wedge 15 is then passed through the opening 14. Said wedge 15 is conical and provided with helical grooves 16 which are also designed to receive the strands of the cable, the said wedge having a groove for each of the large strands of the cable.

Figure 8:
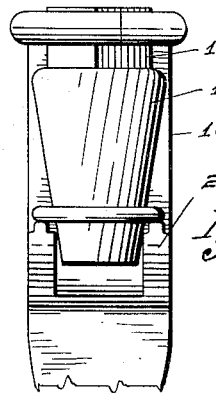
Figure 8 is an end elevation of the same.

In actual operation of the device the body portion 10 is placed into an opening 17 in a supporting bracket 18, said bracket being rigidly secured to a post or similar support by means of a bolt 19. The conical portion 11 is mounted in between fingers 20 extending laterally from said bracket and supported against downward movement by means of a circumferential bead 21. The clamp casing will then be supported in a vertical position with the small end downward, as clearly shown in Figure 8. The cable is then extended upwardly through the bottom of the recess 12. The wedge 15 is then placed in the opening 14 with its pointed end downward and rotated until the grooves 16 are in alinement with the cable strands. The wedge is then driven downwardly by means of a hammer or other instrument until its upper end rests within the opening 14 a slight distance, after which an eye bolt 22 is screwed into the opening 14, which will cause the wedge 15 to be forced between the strands of the cable and cause the said strands to be forced outwardly into the grooves 13 in such a manner that the cable will be rigidly mounted in the member 11 and locked against being pulled outwardly, due to the fact that the inner ends of the strands are flared outwardly against the conical shaped recess. The bracket 18 serves to hold the member 10 against rotation while the screw 20 is being operated. This may be easily accomplished by placing a rod through its eyelet. After the wedge has been moved into position the screw 22 may then be removed if so desired and a connecting screw or bolt 23 substituted, providing means whereby two clamps may be secured together, or a long bolt 24 may be provided whereby the said bolt may be made to serve as an anchor between the cable and its supporting member, such as a post.

One of the advantages of my device lies in forming the helical grooves in the conical shaped recess and also forming helical grooves in the wedge shaped member 15, thus providing means whereby the large strands of the cable may be separated and spread to a flaring position without injuring the smaller strands of the cable or without flattening the strands, but leaving them in cylindrical formation, thereby adding greatly to the strength of the cable at the point where the cable makes connection with the clamp.

It will further be seen that the splice may be easily and quickly made, due to the fact that there is no preliminary operations to be made on the cable before or after it has been placed in the clamp, as has heretofore been necessary with the cable splices in commercial use.

I claim as my invention:

1. A cable clamp comprising a body portion having a screw threaded opening, a clamp portion having a conical recess, the base of the clamp portion being connected to said body portion, the interior of said clamp portion being formed with helical grooves, a conical wedge member having its outer surface provided with helical grooves, and a screw threaded bolt for said opening, said grooves being substantially of the same diameter and pitch as the strands of the cable to be clamped.

2. In combination, a cable clamp comprising a body portion having a conical recess, one end of which communicates with the exterior surface of said body portion, the interior of said body portion being provided with a series of helical grooves of substantially the same diameter and pitch as the strands of the cable to be clamped, a cable having one end extending into said recess, and means for forcing the strands of said cable into said grooves.

3. In combination, a cable clamp comprising a body portion having a conical recess, one end of which communicates with the exterior surface of said body portion, said recess being provided with a series of helical grooves, a cable having one end extending into said recess, means for forcing the strands of said cable into said grooves, said means comprising a conical wedge, and means for applying pressure to said wedge.

4. In combination, a cable clamp comprising a body portion having a conical recess, one end of which communicates with its exterior surface, the interior of said body portion being provided with a series of helical grooves, a cable having one end extending into said recess, means for forcing the strands of said cable into said grooves, said means comprising a conical wedge having a series of helical grooves in its outer surface, and means for applying pressure to said wedge.

5. In combination, a cable clamp comprising a body portion having a conical recess, one end of which communicates with its exterior surface, the interior of said body portion being provided with a series of helical grooves, a cable having one end extending into said recess, means for forcing the strands of said cable into said grooves, said means comprising a conical wedge having a series of helical grooves in its outer surface, and means for applying pressure to said wedge, the last said means comprising a screw threaded bolt.

Des Moines, Iowa, August 24, 1925.

ELMER K. COLE.